Feb. 25, 1964 R. RICE 3,122,734

CODE CONVERSION AND DISPLAY SYSTEM

Filed June 24, 1960 6 Sheets-Sheet 1

INVENTOR
REX RICE

BY Curtis Ailes Jr.

ATTORNEY

Feb. 25, 1964 R. RICE 3,122,734

CODE CONVERSION AND DISPLAY SYSTEM

Filed June 24, 1960 6 Sheets-Sheet 2

Feb. 25, 1964 R. RICE 3,122,734

CODE CONVERSION AND DISPLAY SYSTEM

Filed June 24, 1960 6 Sheets-Sheet 5

Feb. 25, 1964 R. RICE 3,122,734

CODE CONVERSION AND DISPLAY SYSTEM

Filed June 24, 1960 6 Sheets-Sheet 6

United States Patent Office 3,122,734

Patented Feb. 25, 1964

3,122,734

CODE CONVERSION AND DISPLAY SYSTEM

Rex Rice, Poughkeepsie, N.Y., assignor to International Business Machines Corporation, New York, N.Y., a corporation of New York Filed June 24, 1960, Ser. No. 38,646
5 Claims. (Cl. 340—347)

This invention relates to logical circuits which are particularly adapted for conversion of information, such as may be handled by data processing machines, from one code to another code. This invention is more particularly concerned with code converters which depend for their operation on photoresponsive devices.

In this specification, the term "code" will be used to designate any machine functional representation of information, even when such representation may be of a direct decimal nature.

It is well-known that computing and data processing machinery is frequently designed for operation with information which is internally stored and processed in a form (code) different from that usually used for manual operations and computations. For instance, numerical information may be expressed in a binary numbering system (code) instead of in the decimal system (code) in common use for other purposes. Furthermore, there are numerous variations in machine information storage codes which not only differ from the decimal number system but also differ from the so-called pure binary number system. For examples of these various machine language codes see for instance: Chapter 2 of High Speed Data Processing by Gotlieb and Hume, published by McGraw-Hill Book Company in 1958.

Accordingly, a major problem in the use of data processing and computing machinery is the problem of establishing communication between human operators expressing themselves in the decimal system, and machines which store and process data in some other numerical code. A similar problem exists where information must be transferred from one part of a machine to another part of the machine, or to a different machine, in which a different code must be employed.

Accordingly, it is an object of the present invention to provide improved code conversion apparatus for converting information from representation in a first code to representation in a second code.

Another object is to provide improved code conversion apparatus for converting from a decimal representation of the data which is to be fed to a machine by the operator to a machine language code.

Another object of the invention is to provide improved code conversion apparatus for conversion from machine language to a decimal display which can be easily comprehended by the operator.

Another object of the invention is to provide such code conversion apparatus which is rapid in operation and which is simple, inexpensive and reliable.

Another object of the invention is to provide such code conversion apparatus which has all of the above-mentioned advantages and which does not require the expense and complexity of conventional devices such as relays, vacuum tube amplifiers, and transistor amplifiers, etc.

In carrying out the objects of this invention in one preferred embodiment thereof, a circuit is provided for converting information from a first code represented by voltage and no voltage conditions on a plurality of input terminals to a second code represented by voltage and no voltage conditions on a plurality of output terminals. The circuit includes a plurality of voltage responsive light sources and each of the input terminals has a unique connection to at least one of the light sources for illumination thereof in response to an input voltage. Each of the light sources has at least one photoresponsive device associated therewith. Each of the photoresponsive devices is connected to provide a low impedance path to supply a voltage to one of the output terminals when the device is illuminated by the associated light source to thus provide a unique output voltage condition for every unique input voltage condition.

For a more complete understanding of the invention and for an appreciation of other objects and advantages thereof, attention is directed to the following specification and the accompanying drawings which are briefly described as follows.

Figure 1:
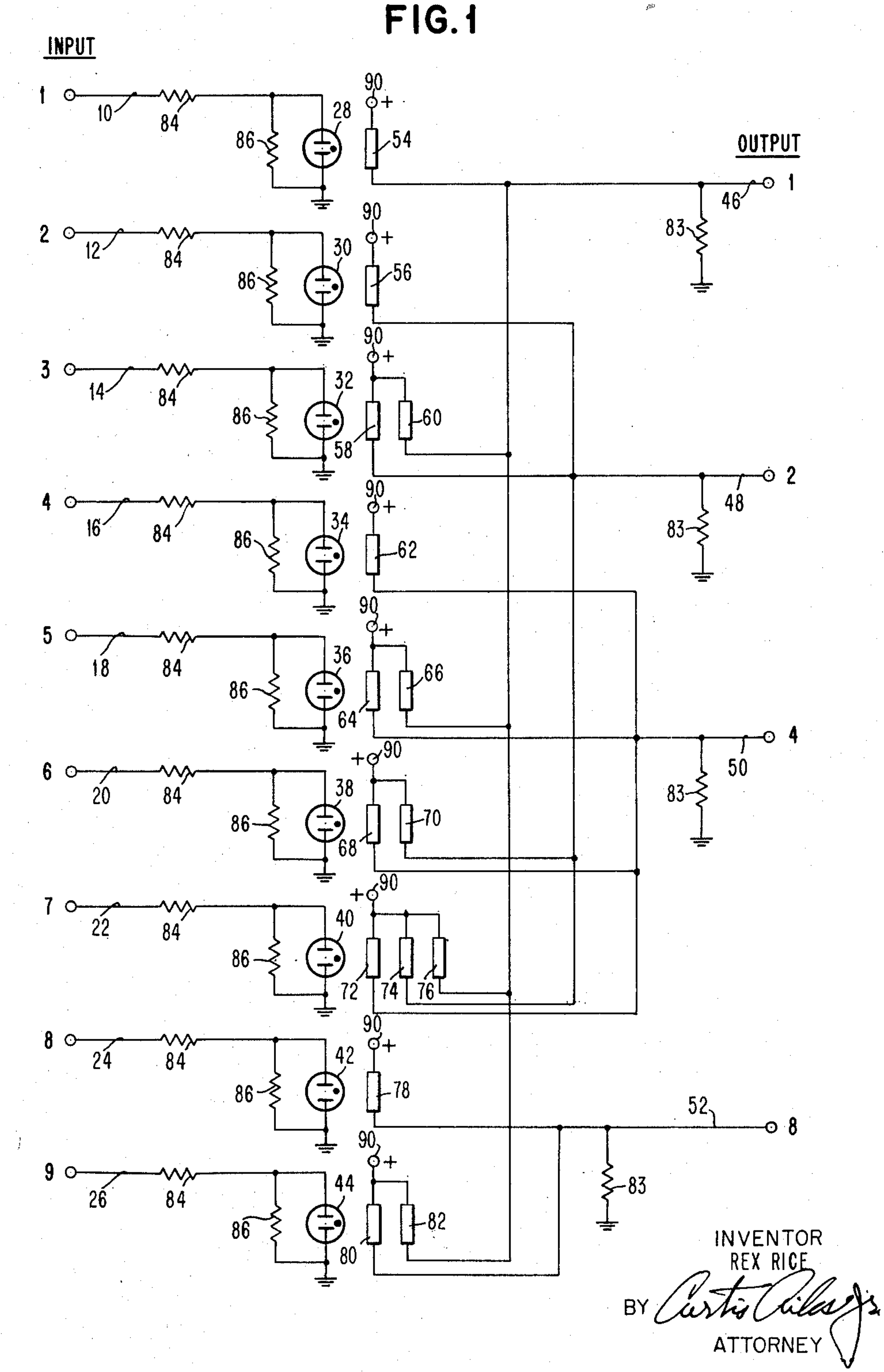
FIGURE 1 is a schematic diagram of a code conversion circuit for converting information expressed in a one-out-of-ten code to a binary code.

Referring in more detail to FIGURE 1, the input voltage and no-voltage conditions on input terminals 10 through 26 control the energization and illumination of voltage responsive light sources 28 through 44 to cause output voltage and no-voltage conditions at the output terminals 46 through 52. The switching for this purpose is accomplished through the medium of photoresponsive devices 54 through 82 whenever such devices are illuminated by the energization of the associated light source. The photoresponsive devices 54 through 82 are photoconductors in which illumination by the associated light source causes photoconductivity such that the device changes from a high to a relatively low electrical resistance to effectively provide a voltage connection to the associated output terminal.

The system of FIGURE 1 is adapted to change information at the input terminals 10 through 26, expressed in a one-out-of-ten code, to a binary code at the output terminals 46 through 52. As used in this specification, a "one-out-of-ten" code is defined as a machine code representation of a decimal number value by means of a voltage on only one out of ten electrical connections, and no voltage on the other nine of the ten electrical connections. The binary code is the usual simple binary system in which each higher order electrical connection represents the next higher exponential value of 2, that is, 1, 2, 4, 8.

The operation of the system of FIGURE 1 may be illustrated for instance by two examples as follows: An input value of decimal 3 will be signified by a voltage on the 3 input line 14 which wil cause illumination of light source 32. Photoconductors 58 and 60 will thus be illuminated to provide an output voltage on each of lines 46 and 48, respectively having the decimal values 1 and 2, to signify decimal 3 expressed in the binary code. Similarly, an input value of decimal 7 at input terminal 22 will illuminate light source 40 to cause illumination of photoconductors 72, 74 and 76. These photoconductors respectively cause output voltages to be present at terminals 50, 48 and 46, having the decimal values 4, 2 and 1, to express the decimal value 7 in binary terms. It is apparent that a similar mode of operation is available to provide the correct binary coded output in response to any decimal input.

The output terminals 46 through 52 are each grounded through resistors, as indicated at 83, to keep the output terminals at ground potential when none of the associated photoconductors are in the low impedance condition. It will be understood that resistors 83 each represent the impedance of the load to which the associated terminal is connected. Accordingly, if the impedance of a load-device (not shown) connected to an output terminal is low enough, no actual separate resistor 83 need be employed. To promote simplicity and clarity in the drawings, the resistors 83 are omitted in all of the other figures, but it will be understood that a load impedance of limited value is present in each instance.

Throughout the various figures of the drawings, the small rectangular symbols employed for photoresponsive elements, such as 54 through 82 in FIGURE 1, will be used to signify devices which have photoconductive properties. Although the term "photoconductive" is used to describe such devices it should be emphasized that devices of this description as employed in the systems of the present invention are really more accurately described as impedances which achieve a substantially reduced impedance value when they are illuminated. Thus it is contemplated that the impedance of one of these devices may be at least in the order of 200 megohms when not illuminated. But, when it is subjected to illumination its resistance may drop to a typical value in the order of 50,000 ohms and very seldom will be illuminated impedance go below a value of 10,000 ohms. Thus, it is to be seen that a device having a minimum resistance of thousands of ohms, although commonly referred to as a photoconductor, should be more accurately described as an impedance having photoresponsive properties. However, the terms "photoconductor" and the like will be used in this specification, keeping these qualifications in mind.

Photoconductive devices having impedance characteristics as described above are commercially available. For instance, one such device may be purchased from the Clairex Corporation, of 50 West 26th Steet, in New York city, under model number CL3A.

The typical impedance of the photoconductor as indicated above, at 50,000 ohms when illuminated, is applicable when the illumination is from a neon glow lamp positioned within reasonable proximity to the photoconductor. Small, inexpensive neon glow lamps which are suitable for this purpose are commonly available. A typical device of this kind is available for instance from the General Electric Company under Model No. NE-2. Such a device may require about 70 volts to initiate glow conduction when new, but after appreciable aging has occurred, the firing voltage may advance to the order of 115 volts. After such a device has become illuminated, a negative resistance effect is to be observed such that the voltage across the glow lamp may drop to about 55 volts in a fresh lamp, and may advance to a value in the order of 100 volts as the lamp progressively ages. The current required for such a neon may vary from one quarter of a milliampere to one milliampere.

It will be appreciated that various other voltage responsive light source devices may be employed and that other photoconductive devices may be used to detect the illumination from such devices. For instance, the voltage responsive light sources might be electroluminescent devices or incandescent filament devices or devices employing gaseous discharges to derive illumination from fluorescent coatings. In each instance, photoconductive devices would be selected which are particularly responsive to the spectrum of light emitted by the light sources employed. Fortunately, the neon lamps mentioned above and the photoconductive devices mentioned above work well together. Accordingly, the neons are preferred and the light sources in the present application are all indicated as being neon light sources, but it will be understood that other sources could be employed if desired.

One important advantage of the neon glow lamp as an electrical voltage responsive light source in the present system is the fact that it remains substantially completely dark until its firing voltage threshold is achieved, at which time it suddenly provides substantially full output illumination. This characteristic is very desirable because it prevents false operation as long the voltage is below the threshold value.

With neon glow lamps, it is generally necessary that some series impedance be employed, as well as some shunt impedance. In FIGURE 1, the series impedance for each light source is indicated at 84 and a shunt resistor at 86. The value of each of the shunt resistors is preferably about one megohm. This one megohm shunt resistor across each neon serves to set a maximum impedance for the neon with respect to the remainder of the circuit. It will be appreciated that the circuits providing energization for lamps 28 through 44 may be of a complex nature and that the series resistors 84 may therefore be remote from the input terminals 10 through 26 and in series with other circuit components which do not form part of this invention and are not shown. Although impedance values for the various circuit components are not specified, it will be understood that whenever operation is required to provide output illumination, the series impedances for the various neons will be so chosen as to result in a neon current in the order of one milliampere.

In order to simplify the drawings and make them clearer and more easily understood, in all of the remaining figures, the lamp shunt resistors 86 and the series resistors 84 are omitted, but it will be understood that corresponding impedances are to be employed in the practical embodiments of the invention. Also the convention will be employed that each photoconductor is arranged to be illuminated only by the first light source to the left of that photoconductor and in horizontal alignment therewith. Furthermore, in all of the embodiments of the invention which are here disclosed, each photoconductor is arranged for illumination from only one light source.

Also, to further simplify the drawings, the power supply connections are not wired in, either at the common ground connection or at the high voltage connections. The common ground connections are indicated conventionally by the ground symbol, and the high voltage connections are indicated by a terminal symbol as at 90 with a + sign. The value of the supply voltage may be selected to conform to the impedance values and the current requirements of the circuit design. A good workable value of supply voltage has been found to be about 300 volts. When employing neon lamps as the light sources, it has been found desirable to employ a direct current power supply source, or an alternating current power supply at a frequency of about 1000 cycles. With other light sources, other voltages and frequencies may be employed. It will be understood that conventional sources of power may be employed to obtain satisfactory operation of the systems of the present invention.

It will be understood that the code converters of the present invention may form a part of a larger system and the input terminals 10 through 26 of FIGURE 1, for instance, may derive their voltages through other photoconductors illuminated by other light sources, not shown. Also, it is contemplated that the output terminals 46 through 52 may be connected to energize other voltage responsive light sources or to actuate other apparatus which is not shown.

It is one of the important features of the systems of this invention that complete electrical isolation is achieved between the input terminals and the output terminals because of the purely optical coupling afforded between the light sources 28 through 44 and photoconductors 54 through 82.

Figure 2:
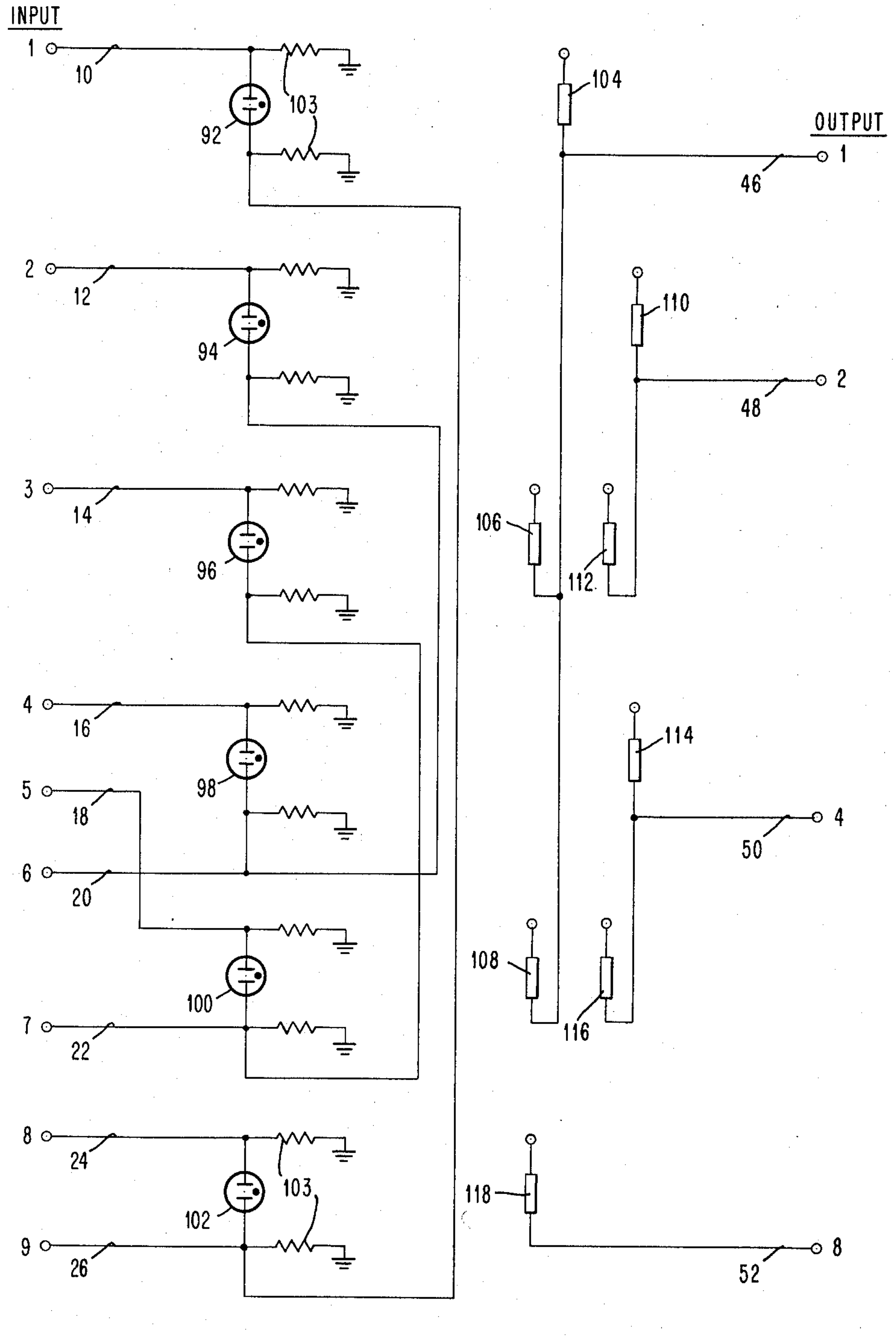
FIGURE 2 is a schematic diagram showing a modification of the code converter of FIGURE 1.

FIGURE 2 is a schematic diagram showing a modification of the code converter of FIGURE 1 in which substantial changes have been made in the apparatus between input terminals 10 through 26 and output terminals 46 through 52 in order to reduce the number of lamps and photoconductors required. For this purpose, in this embodiment it is required that the input terminals representing decimal values 6, 7 and 9 must receive input signals from voltage sources which are capable of supplying sufficient current to light two lamps simultaneously. It is assumed for purposes of this disclosure that such input signal sources are available whenever the decimal input has the value 6, 7 or 9.

The lamps 92 through 102 in this embodiment are connected in a manner similar to that disclosed in co-pending patent application Serial Number 3,861, entitled "Photoresponsive Logical Circuits," filed January 21, 1960, and assigned to the same assignee as the present application. In these circuits, each terminal of each lamp is grounded through a resistor as indicated for instance at 103, and each lamp terminal is also connected to an input terminal of the circuit. Therefore, an input signal on either input terminal connected to a particular lamp will cause an elevation of the potential across that lamp sufficient to cause illumination thereof. Such illumination provides for an output through one or more photoconductors. For instance, if the input value is 1, signified by an input voltage on terminal 10, the upper terminal of lamp 92 is at high voltage, illuminating this lamp to reduce the impedance of photoconductor 104 to supply an output at the output terminal 46. Similarly, if an input value of 9 is supplied on input terminal 26, the lower terminal of lamp 92 is elevated in potential, again causing illumination of photoconductor 104 to provide a 1 output at terminal 46. In this instance, the output at terminal 46 forms only part of the 9 value output provided by this signal plus a signal on the 8 output terminal 52. For the 9 input also lights lamp 102 to illuminate photoconductor 118. It is apparent that the various input signals cause selective illumination of the photoconductors 104 through 118 to convert the one-out-of-ten input code to the binary output code. As another example, a 2 input lights lamp 94 to illuminate photoconductor 110 to provide a 2 output. A 3 input lights lamp 96 to illuminate photoconductors 106 and 112 to provide a 1 and a 2 output. A 4 input will energize lamp 98 to illuminate photoconductor 114 to provide a 4 output. A 5 input will energize lamp 100 to illuminate photoconductors 108 and 116 to provide 1 and 4 outputs. A 6 input will energize lamps 98 and 94 to illuminate photoconductors 114 and 110 to provide 4 and 2 outputs. A 7 input will energize lamps 100 and 96 to illuminate photoconductors 108, 116, 106 and 112 to provide 1, 4 and 2 outputs.

Figure 3:
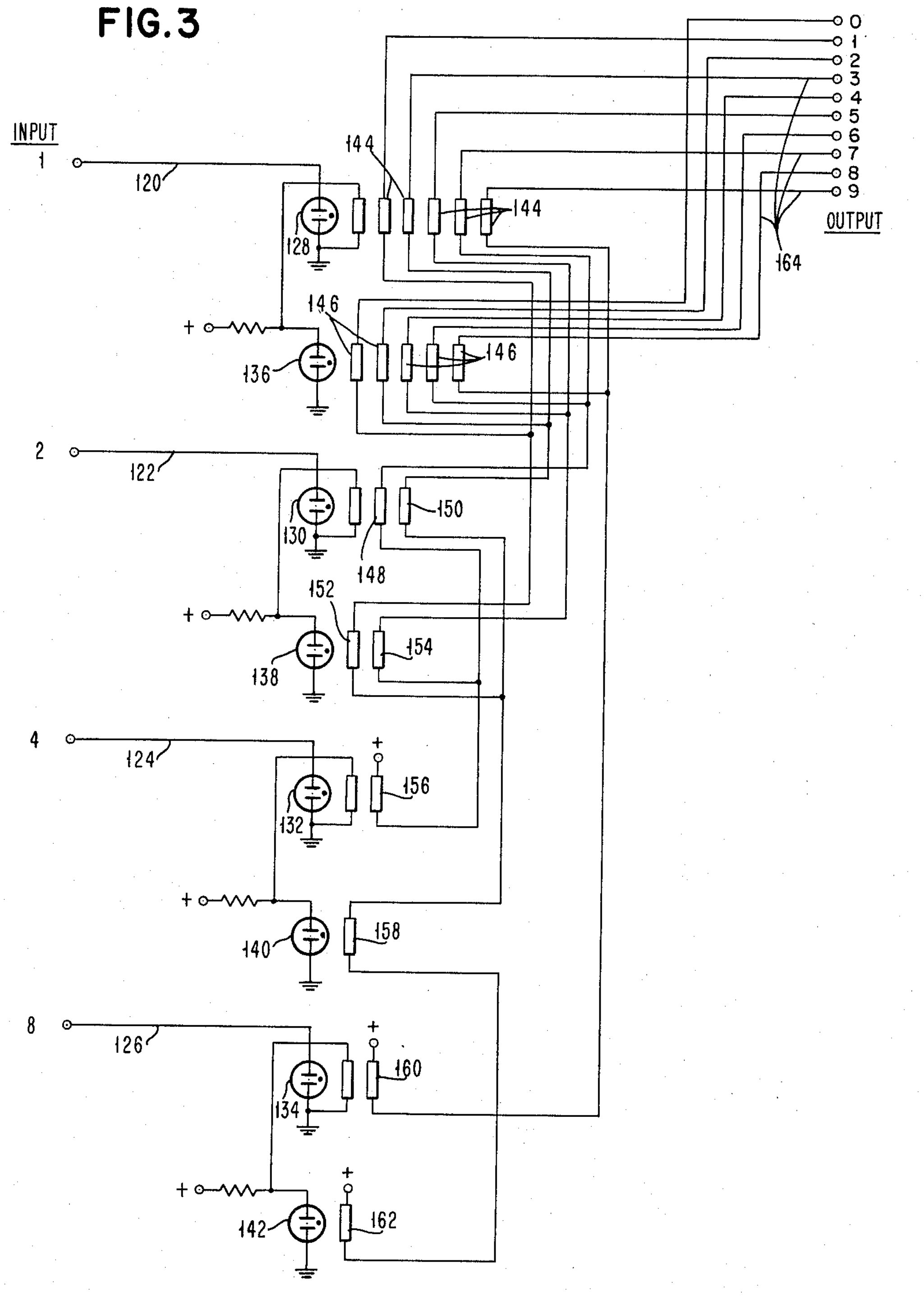
FIGURE 3 is a schematic diagram of a code conversion circuit for converting information represented in a binary decimal code to a one-out-of-ten code.

FIGURE 3 is a schematic diagram of a code conversion circuit for accomplishing the converse conversion, from a binary coded decimal input to a one-out-of-ten code decimal output. For this purpose, each of the input terminals 120 through 126 representing the binary values 1, 2, 4 and 8 is connected to a separate lamp respectively indicated at 128, 130, 132 and 134. Each of these input light sources has associated therewith immediately to the right in the diagram a first photoconductor which, when illuminated, establishes a low impedance path to ground across an associated lamp which may be said to represent the converse of the input function, or the "NOT" function. Thus, the "NOT 1," "NOT 2," "NOT 4," and "NOT 8" functions are respectively represented by lamps 136, 138, 140 and 142. Each of these "NOT" function light sources is normally energized, except when extinguished by the illumination of the associated grounding photoconductor just described by the associated positive function lamp.

Switching photoconductors indicated at 144 through 162 are arranged in proximity to the various positive and "NOT" function lamps and connected through AND circuits to generate the required "one-out-of-ten" code output at the respective numbered output terminals indicated at 164. This circuit is designed to deal with input values which do not exceed decimal 9 and accordingly the circuit as shown does not provide for recognition of higher valued inputs.

The operation of the photoconductor AND circuits for providing the outputs will be apparent from a few illustrative examples. For instance, for the decimal value 2, an input signal will exist only on input terminal 122, illuminating lamp 130, which in turn extinguishes NOT 2 lamp 138. The NOT 1, NOT 4, and NOT 8 lamps 136, 140 and 142 remain on. Accordingly, a low impedance circuit path is provided starting at photoconductor 162 at the NOT 8 lamp 142 and continuing through photoconductor 158 at the NOT 4 lamp 140, photoconductor 150, at the 2 function lamp 130 and thus through one of the photoconductors 146 at the NOT 1 lamp 136 to the output terminal 2 of the set of output terminals 164. It is to be seen that another branch of the circuit commencing with photoconductors 162 and 158 is provided through photoconductor 152 indicating the NOT 2 function. And that branch is further divided into a circuit including one of the 1 function photoconductors 144 to provide the decimal output value 1 and one of the NOT 1 photoconductors 146 to provide the output value 0. Similar circuitry is provided for the other decimal values. For instance, a circuit commencing with the 8 input photoconductor 160 branches at photoconductors 144 and 146 to provide the 9 and 8 output values respectively, and a circuit commencing with the 4 input photoconductor 156 and continuing through the 2 input photoconductor 148 branches at 144 and 146 to provide the 7 and 6 functions respectively.

Figure 4:
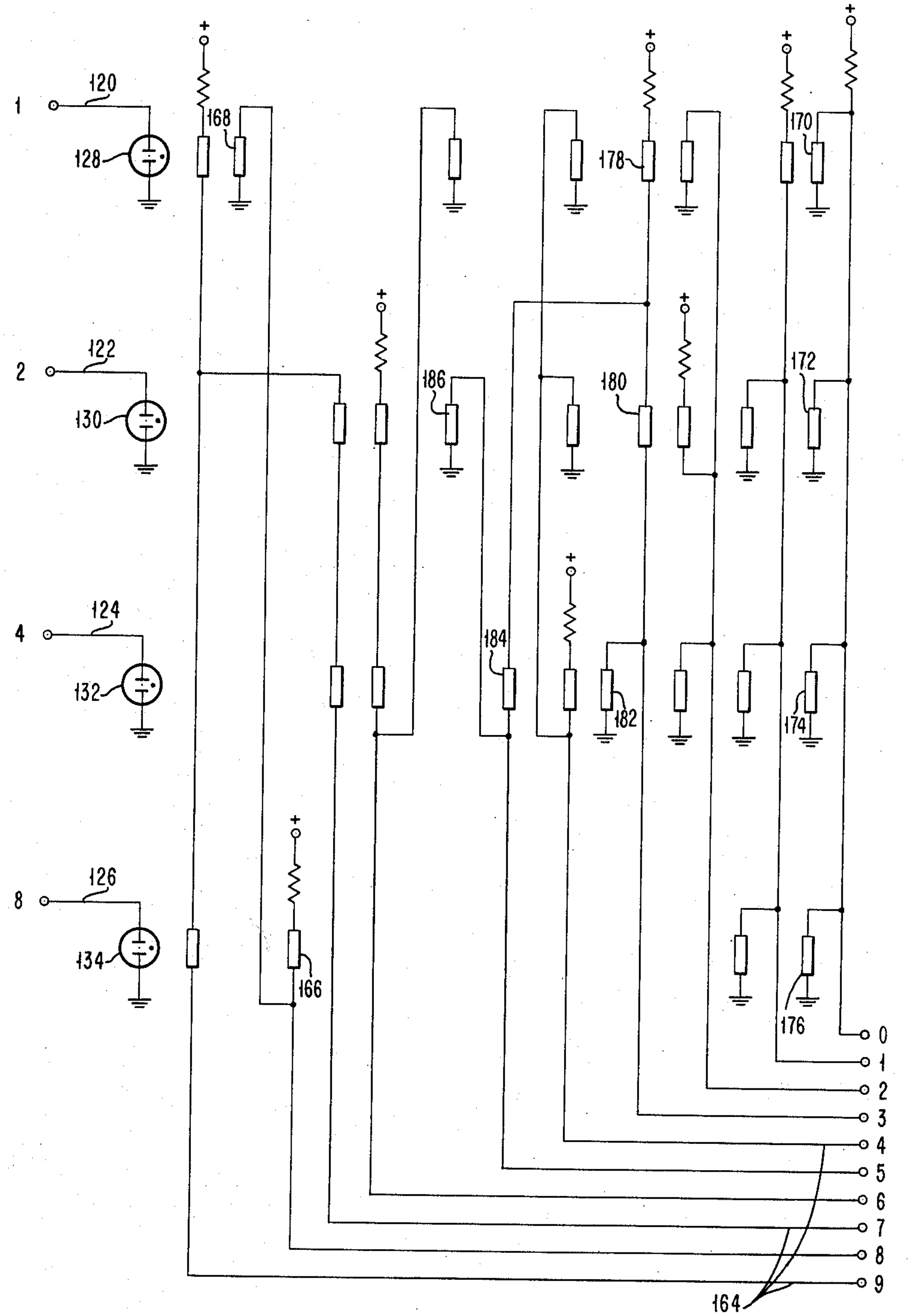
FIGURE 4 is a schematic diagram showing a modification of the code converter of FIGURE 3.

FIGURE 4 shows a modification of the system of FIGURE 3 in which the NOT function lamps 136, 138, 140, and 142 have been eliminated, and instead, the NOT functions are provided by individual grounding photoconductor elements connected with each of the individual output circuits. In order to simplify the circuitry of FIGURE 4, the photoconductors have been spread out horizontally in the circuit diagram and the convention must be kept in mind that each photoconductor shown is intended to be physically in proximity to, and illuminated by, the lamp shown to its left. The operation of this system is illustrated for instance by tracing the circuit for the decimal 8 output. For an 8 input on the input terminal 126, illumination of lamp 134 will result, which will cause the completion of a circuit through photoconductor 166 to the 8 value output terminal of the terminals 164. However, if an input is also present at the 1 value input terminal 120, lamp 128 will illuminate photoconductor 168 to shunt to ground the voltage supplied through photoconductor 166 so that it will not appear at output terminal 8. This is proper since the concurrent inputs on the 1 and 8 lines signify the decimal 9 rather than the decimal 8 value. Similar circuit principles are employed to generate each of the other decimal output functions. For instance, the 0 function is always generated unless any one or more of the input functions are present so as to illuminate any of the 0 function shunting photoconductors 170 through 176. With certain pairs of output circuits it is possible to share at least one photoconductor in common. For instance, photoconductor 178 supplies the 1 input value function to both the 3 and the 5 output circuits. The 3 output circuit is completed by photoconductor 180 for the 2 input value function, and a shunting photoconductor 182 is provided for this circuit in the presence of the 4 input value function. Similarly, the 5 output circuit is completed by a 4 input value photoconductor 184 and a shunting photoconductor 186 is provided which is responsive to the presence of the 2 input value function.

It is believed that the operation of the remainder of these circuits is apparent from the explanation above of the operation of the 8, 0, 3 and 5 output circuits. Generally speaking, concurrent input signals are detected here by photoconductor AND circuits formed by two or more photoconductors connected in series. Whenever the presence of an input requires the negation of a particular output, a shunting photoconductor is provided for that output circuit.

Figure 5:
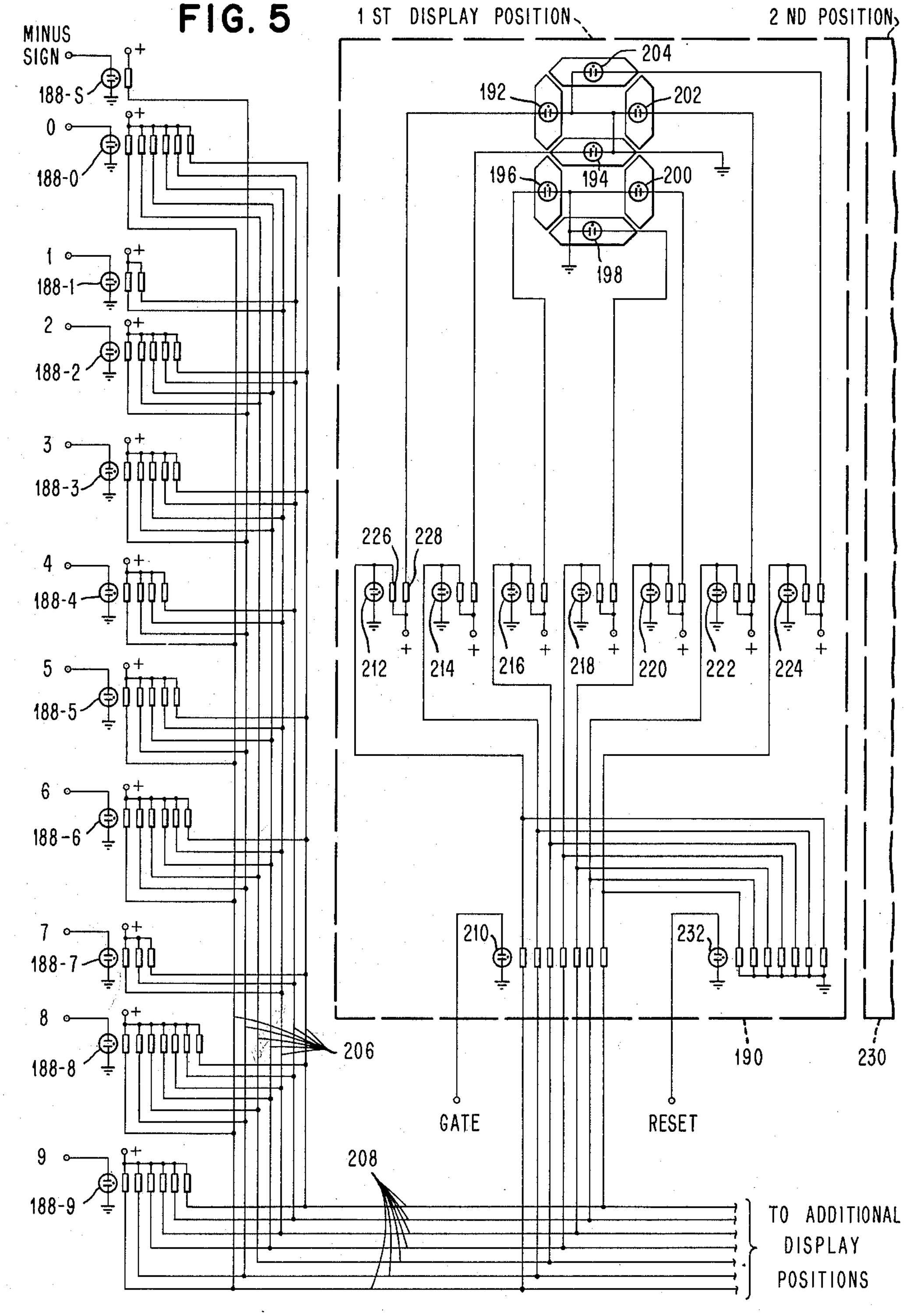
FIGURE 5 is a schematic diagram of a modification of the circuit of FIGURE 1 for converting from a one-out-of-ten code to a special code which is adapted to control an illuminated display device for the purpose of forming a display of the decimal number represented by the input signal.

FIGURE 5 is a schematic diagram of a modification of the circuit of FIGURE 1 which is a combined decoding and display apparatus. In this modification, input signals in the decimal one-out-of-ten code, or a minus sign, supplied at the labelled input terminals are operative to light the respective associated lamps 188–S and 188–0 through 188–9 to cause an appropriate illuminated display of the minus sign or the decimal number in a display apparatus indicated generally at 190.

The visible portion of the display is made up of seven character segments which may be selectively illuminated by individual lamps 192 through 204 to represent the different decimal values, or a minus sign. For instance, a figure 8 is formed by lighting all seven of these lamps, a figure 1 is formed by lighting only lamps 200 and 202, a figure 2 by lighting lamps 204, 202, 194, 196 and 198. Since different predetermined combinations of the display lamps 192 through 204 must be energized by each decimal input value, coded switching apparatus is necessary in order to switch on each of the required display lamps for each input value. This switching is accomplished through the photoconductors associated with each of the lamps 188–S and 188–0 through 188–9. Thus, for instance, if a 7 input signal is present to energize lamp 188–7, the associated photoconductors put an operating voltage on each of the last three vertical lines on the right of the code converter output circuit lines indicated at 206. These lines ultimately cause operation of display lamps 204, 202, and 200. The operation of intervening circuitry may be briefly described as follows. The individual input lamps 188 provide power through their associated photoconductors to selected common code converter output lines 206. From the vertical output lines 206, these converted code signals are supplied to the horizontal busses 208. These signals are gated into digit display apparatus 190 by means of series connected photoconductors associated with a gate lamp 210 which is illuminated when gating is to occur. The voltage signals are thus supplied to seven latching lamps 212 through 224. Each of these latching lamps is connected to illuminate a first photoconductor (as illustrated at 226 for lamp 212) which supplies a low impedance path to a power source, to latch the lamp in the illuminated condition, the lamp itself supplying the illumination which creates the photoconductive path for its own power, after the lamp is once energized from the signals from 208. Each of the latching lamps also is arranged to illuminate a second photoconductor (as indicated at 228 for lamp 212), which supplies a photoconductive path to one of the display lamps 192 through 204. Thus, it will be seen for instance that if an input is present at input lamp 188–7, indicating a decimal value of 7, the photoconductors associated with that lamp will provide voltage to the last three lines on the right in the common output lines 206 from the code converter, which signals will be supplied to the three top lines of the horizontal busses 208. These signals will in turn be transmitted through the three right hand gate circuits of the gate lamp 210, if the gate lamp is energized, to energize the latch lamps 220, 222, and 224. The latch lamps will latch themselves in the illuminated condition and will cause energization of lamps 200, 202 and 204 to provide the display indicative of the decimal number 7.

From an inspection of this circuit it will be apparent that each of the input lamps 188 causes circuits to be completed to the display lamps which are appropriate to indicate the value of the input signal. The minus sign lamp 188–S energizes only the output lines which is second from the left in group 206 which results only in illumination of display lamp 194. The 0 input lamp 188–O causes energization of all of the other display lamps to provide a single open box display representing the character 0.

It will be appreciated that once the appropriate latch lamps 212 through 224 have been energized and latched on, the information which passed from the code converter to the display device 190 through gate 210 is maintained in storage and continuously displayed by the lamps 192 through 204, even though the gate lamp 210 may be de-energized. Thus, signals from the code converter may be fed along the horizontal busses 208 and gated into other display positions containing apparatus substantially identical to that shown for the first display position apparatus 190. The second position is indicated, for instance, by the partial box 230. The first display position and the other subsequent associated display positions may be employed together to display the individual digits of a multiple digit decimal number. It will be apparent that the individual digits of such a number may be fed in serially timed fashion through the single code converter system comprising the lamps 188 and individually gated in sequence into the appropriate display positions. The circuitry for timing this sequential operation of the system may be of conventional construction and is not shown.

While the arrangement of the system shown in FIGURE 5 suggests that the highest order digit is stored in the first display position, it will be understood that it may be desirable to switch the sequence of the system to display the lowest order digit first and to progressively convert and display the higher order digits.

When it is necessary to clear the display storage apparatus, this may be accomplished by connecting a photoconductive shunt circuit across each of the latching lamps 212 through 224. This function is provided by a reset lamp 232 having photoconductors associated therewith which are in shunt circuit relationship to the latch lamps. Normally the photoconductors associated with reset lamp 232 are in the high resistance state and they do not affect the operation of the system in any way except when the reset operation is required. Although not shown, it will be understood that there is sufficient series resistance in each of the latch circuits of the latching lamps 212 through 224 so that the current drain will not be excessive during the operation of the reset shunt circuits controlled by lamp 232.

It will be appreciated that the connection busses 208 in FIGURE 5 are analagous to the output terminal connections shown in the prior code conversion systems and busses 208 may be referred to hereinafter as output terminals. Thus, the apparatus in FIGURE 5 which is electrically connected between the input terminals and the connection busses 208 constitutes a special code converter in which the input information is expressed in the one-out-of-ten decimal code and the output information is expressed in a special seven bit code which is adapted for energizing the display apparatus 190. It is believed to be apparent from the code converter system modifications shown in FIGURES 1 through 5, and particularly from the embodiment of FIGURE 5, that it is possible to employ the teachings of the present invention to convert information from any first code to any other second code, as required.

Figure 6:
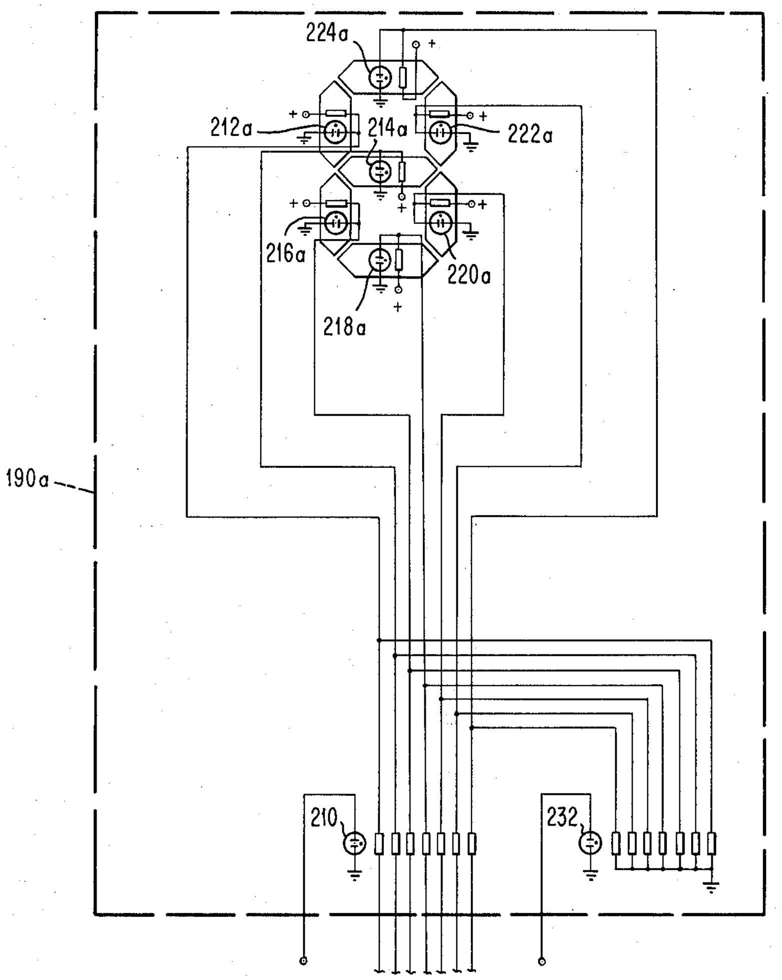
FIGURE 6 is a schematic diagram showing a modification of the display portion of the system of FIGURE 5.

It will be observed that in the display apparatus 190 of FIGURE 5, whenever a display segment such as the top segment 204, is illuminated, a corresponding latch lamp such as 224 is also illuminated continuously. In FIGURE 6 there is shown a modification 190*a* of the display apparatus 190, in which the latch lamps 212 through 224 are themselves arranged within the display device to illuminate the display segments as indicated at 212*a* through 224*a*. It is possible to place the latch photoconductor for each of these latch lamps within the display device, as indicated in FIGURE 6, so that the light from each of these lamps may be used for the prior purpose of latching, and may also be used concurrently to provide the visual display. This modification results in a saving of seven lamps (192 through 204 in FIGURE 5) and seven photoconductors (corresponding to 228 in FIGURE 5). This modification also results in faster operation, since the display is obtained immediately upon the lighting up of the latch lamps, with no time required for the latch lamps to in turn cause the energization of separate display lamps. In every other respect, the display apparatus 190*a* of FIGURE 6 is identical to that of 190 in FIGURE 5.

Figure 7:
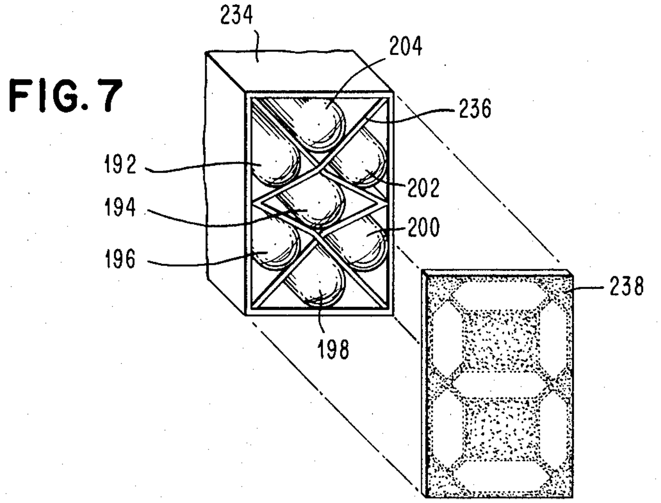
FIGURE 7 shows a preferred form of the physical structure of a display device which may be used in the system of FIGURE 5.

In FIGURE 7 there is shown in a front perspective a partial view of a preferred physical structure which may be employed for the display device including the lamps 192 through 204 of FIGURE 5. A box-like enclosure 234 is provided in which there are arranged resilient insulating sheet members 236 in a configuration as shown. The members 236 may be formed of an inexpensive resilient insulating sheet material such as fibre board which is not only an electrical insulator, but is also resistant to the heat of the lamps and provides an essentially opaque light shield which keeps the light of each lamp within its distinct compartment. Members 236 are arranged together in an interlocked relationship in a manner similar to the internal separators sometimes used in cardboard egg cartons. The front edges of members 236 preferably terminate in the same plane with the front edges of the container 234. The members 236 are preferably resilient enough to grip the individual lamps 192 through 204, and to support these lamps securely. The lamps are preferably in the shape of somewhat elongated cylinders, with their ends exposed at the front of the openings formed by the box 234 and the members 236.

The front of the box, and the individual lamp compartments are closed by a mask member 238 which is preferably formed of a translucent material such as frosted glass and which is partially blacked out to define the display pattern discussed previously above and first shown in FIGURE 5. This defining pattern may be provided by a suitable coating upon the glass, or by a separate perforated sheet member of an opaque material. It will be seen from the drawing that when the mask member 238 is assembled to the front of the enclosure 234, the compartments formed by the members 236 for the individual lamps separate the space behind the mask in such a way that each lamp lights only the desired display segment. A number of these display devices may be arranged together in a compact formation for the purpose of displaying multiple digit decimal numbers. It will be appreciated that devices other than the one illustrated in FIGURE 7 may be employed for the display of the information which is converted by the code conversion system of FIGURE 5.

While the invention has been particularly shown and described with reference to preferred embodiments thereof, it will be understood by those skilled in the art that various changes in form and details may be made therein without departing from the spirit and scope of the invention.

What is claimed is:

1. Apparauts for receiving machine information in a first code in which the presence of input voltages is assigned different weighted values on different input terminals and in which concurrent input voltages upon a plurality of different input terminals are accorded the weighted sums of the individual weighted values, and for converting the machine information so received into a second code in which values are represented by a voltage on only one of a plurality of output terminals, comprising a separate first voltage responsive light source connected to each of said input terminals for illumination in response to an input voltage thereon, a normally energized inverse function second voltage responsive light source for the values represented by each of said input terminals, a separate photoconductive device arranged in proximity to each of said first light sources and connected in shunt circuit across the associated second light source to cause the second light source to be extinguished whenever the corresponding first light source is illuminated in response to a signal received at the associated input terminal, a separate output circuit connected to each of said output terminals, each of said output circuits comprising a separate photoconductive device connected to the associated output terminal and including at least one additional photoconductive device connected in series therewith to a source of supply voltage, the different photoconductive devices within each of said output circuits being arranged to receive illumination from different ones of said light sources.

2. Apparatus for receiving machine information in a first code in which the presence of input voltages is assigned different weighted values on different input terminals and in which concurrent input voltages upon a plurality of different input termials are accorded the weighted sums of the individual weighted values, and for converting the machine information so received into a second code in which values are represented by a voltage on only one of a plurality of output terminals, comprising a separate first voltage responsive light source connected to each of said input terminals for illumination in response to an input voltage thereon, a normally energized inverse function second voltage responsive light source for the values represented by each of said input terminals, a separate photoconductive device arranged in proximity to each of said first light sources and connected in shunt circuit across the associated second light source to cause the second light source to be extinguished whenever the corresponding first light source is illuminated in response to a signal received at the associated input terminal, a separate output circuit connected to each of said output terminals, each of said output circuits comprising a plurality of photoconductors connected in series circuit relationship to provide an AND function, said photoconductive devices being arranged for illumination by different ones of said light sources representing the combination direct and inverse functions of the input voltage signals requiring the energization of said output circuit.

3. Apparatus for receiving machine information in a first code in which the presence of input voltages is assigned different weighted values on different input terminals and in which voltages upon a plurality of input terminals are accorded the weighted sums of the individual weighted values, and for converting the machine information received to a second code in which each value is represented by a voltage on only a selected one of a plurality of output terminals, comprising a separate voltage responsive light source connected to each of said input terminals for illumination in response to an input voltage thereon, a separate output circuit connected to each of said output terminals, each of said output circuits for which an output is required in response to the presence of an input signal including a separate photoconductor arranged in series circuit relationship between a voltage source and said output terminal, each of said output circuits for which an output is required in response to a plurality of input signals including a plurality of series connected photoconductors arranged respectively to receive illumination from the light source energized from said respective input terminals, said series connected photoconductors being connected from a voltage source to the associated output terminal, and each of said output circuits for which there is to be a no-voltage output condition in response to a particular input voltage signal including a shunt photoconductor connected to shunt said output circuit in response to illumination from the light source connected to that input terminal.

4. Apparatus for receiving machine information in a first code represented by voltage and no-voltage conditions on a plurality of input terminals and for converting said information to a second code in which values are represented in a segmented visual display in which individual segments are controlled by voltage and no-voltage conditions on a plurality of output terminals, at least one of the second code values to be represented being indicated by concurrent voltages on a plurality of said output terminals, comprising a plurality of voltage responsive lamps, each of said input terminals having a unique connection to at least one of said lamps for illumination thereof in response to an input voltage, a photoconductor connected to each of said output terminals for every input terminal condition which requires an output at that output terminal, each of said photoconductors being positioned for illumination by a lamp which is energized from the input terminal for which an input signal voltage requires an output signal to the associated output terminal, and a display apparatus comprising a separate photoresponsive latch connected to each of said output terminals for energization therefrom, each of said latches comprising a voltage responsive lamp and a photoconductor arranged for illumination thereby and connected to provide a voltage thereto when once illuminated, the connections of each of said latches to said output terminals including individual gate photoconductors arranged for illumination from a common gate lamp whenever connections to said latches are required, a separate re-set photoconductor connected in shunt with each of said latch lamps, and a re-set lamp arranged to illuminate all of said re-set photoconductors whenever said latches are to be re-set.

5. Apparatus for receiving machine information in a first code in which each numerical value is represented by the presence of a voltage on only one of a plurality of input terminals and for converting said information to a second code in which values are represented on a segmented visual display device in which individual segments are controlled by voltage and no-voltage conditions on a plurality of output terminals, at least one of the possible second code values to be represented being indicated by concurrent voltages on a plurality of said output terminals, comprising a separate voltage responsive lamp connected to each of said input terminals for illumination in response to an input voltage thereon, a photoconductor connected to each of said output terminals for every input terminal condition which requires an output at that output terminal, each of said photoconductors being positioned for illumination by the lamp which is energized from the input terminal for which an input signal voltage requires an output signal to the associated output terminal, a separate photoresponsive latch connected to each of said output terminals for energization therefrom, each of said latches comprising a voltage responsive lamp and a photoconductor arranged for illumination thereby and connected to provide a voltage thereto when once illuminated, the connections of each of said latches to said output terminals including individual gate photoconductors arranged for illumination from a common gate lamp whenever connections to said latches are required, a separate re-set photoconductor connected in shunt with each of said latch lamps, a re-set lamp arranged to illuminate all of aid re-set photoconductors whenever said latches are to be re-set, a visual display device having electrically operable individual display segments, each of said segments being connected for energization through a separate photoconductor, and each of said segment photoconductors being positioned for illumination by a different one of said latch lamps.

References Cited in the file of this patent

UNITED STATES PATENTS

| | | |
|---|---|---|
| 2,966,673 | Guernsey | Dec. 27, 1960 |
| 2,998,530 | Marshall | Aug. 29, 1961 |

OTHER REFERENCES

Lyman and Jones: "Electroluminescent Panels for Automatic Displays," Electronics, pp. 44 to 47, July 10, 1959.